United States Patent [19]

Berman

[11] Patent Number: 5,050,966
[45] Date of Patent: Sep. 24, 1991

[54] OPTICAL COMBINER COLLIMATING APPARATUS

[75] Inventor: Arthur L. Berman, Milpitas, Calif.

[73] Assignee: Kaiser Aerospace & Electronics Corporation, Oakland, Calif.

[21] Appl. No.: 215,668

[22] Filed: Jul. 6, 1988

[51] Int. Cl.$^5$ .......................... G02F 1/13; G02B 27/14
[52] U.S. Cl. ......................................... 359/38; 359/53; 359/70; 359/630
[58] Field of Search ............ 350/335, 337, 338, 339 F, 350/352, 171, 172, 174, 379, 388, 401, 403, 352, 334

[56] References Cited

U.S. PATENT DOCUMENTS

| | | | |
|---|---|---|---|
| 3,679,290 | 7/1972 | Adams et al. | 350/352 |
| 3,711,181 | 1/1973 | Adams, Jr. et al. | 350/352 |
| 3,780,307 | 12/1973 | Saeva et al. | 350/352 X |
| 3,923,370 | 12/1975 | Mostrom | 350/55 |
| 3,942,871 | 3/1976 | Saeva | 350/352 X |
| 3,953,117 | 4/1976 | Cannon | 350/174 X |
| 4,073,571 | 2/1978 | Grinberg et al. | 350/337 X |
| 4,193,666 | 3/1980 | Cojan | 350/174 |
| 4,447,128 | 5/1984 | Ferrer | 350/174 |
| 4,560,233 | 12/1985 | Banbury | 350/174 X |
| 4,655,540 | 4/1987 | Wood et al. | 350/174 X |
| 4,670,744 | 6/1987 | Buzak | 350/335 X |
| 4,679,911 | 7/1987 | Jacobs et al. | 350/335 X |
| 4,688,879 | 8/1987 | Fairchild | 350/174 X |
| 4,697,879 | 10/1987 | Gerbe | 350/174 |
| 4,726,663 | 2/1988 | Buzak | 350/335 X |
| 4,761,056 | 8/1988 | Evans et al. | 350/174 |
| 4,859,031 | 8/1989 | Berman et al. | 350/352 X |
| 4,900,133 | 2/1990 | Berman | 350/346 |

FOREIGN PATENT DOCUMENTS 0154953 9/1985 European Pat. Off. .
2149140 6/1985 United Kingdom .

OTHER PUBLICATIONS

Adams et al., "Cholesteric Films as Optical Fibers", Journal of Applied Physics, vol. 42, No. 10, Sep. 1971.
Kahn, "Cholesteric Liquid Crystals for Optical Applications", Applied Phys. Lett., vol. 18, No. 6, Mar. 15, 1971.
Adams and Haas, "Lossless Polarizer", Xerox Disclosure Journal, vol. 1, No. 3, Mar. 1976.
Sutton, Surrey, "Holographic 'Mirror' Helps Fighter Pilots to See," Engineering Materials Design, vol. 31, No. 4, Apr. 1987.

Primary Examiner—Stanley D. Miller
Assistant Examiner—Huy K. Mai
Attorney, Agent, or Firm—Townsend and Townsend

[57] ABSTRACT

An improved optical display system, such as a head-up display system. A highly transmissive light-weight and shatterproof optical combiner is provided. The combiner includes at least one cholesteric liquid crystal element for transmitting a first image in a line of sight and for reflecting a second image into the line of sight. Multiple cholesteric elements are used in a multicolor shutter, a multicolor combiner, and a multicolor collimator to display a multicolor image.

17 Claims, 6 Drawing Sheets

OPTICAL COMBINER COLLIMATING APPARATUS

The present invention relates generally to the field of visual display systems for use in aircraft flight simulators, etc., and more particularly relates to light-weight, highly transmissive liquid crystal cholesteric elements for combining a projected image with an observed image in a line of sight.

DESCRIPTION OF THE PRIOR ART

Optical apparatus capable of combining images incident from several directions have been known for some time. Various such devices are commonly used in display systems such as head-up display systems, data display systems and holographic display systems.

For example, U.S. Pat. No. 4,711,512 teaches a head-up display system having a compact combiner assembly. The combiner assembly includes two glass plates having a liquid between.

U.S. Pat. No. 4,697,879 discloses a system for collimating images to present a first wide field of view, high definition, monochrome landscape image, and a second synthetic color symbolic image. This system employs a common collimating device.

U.S. Pat. No. 4,193,666 describes a display collimator system for displaying electronically generated data, and specifically address the problems of adequate space and mechanical limitations relating to reticles for a head-up display. This system uses a semitransparent combining glass.

U.S. Pat. No. 4,560,233 discloses a head-up display system for achieving high accuracy color display images. A combiner is disclosed which consists of a diffractive optical element having narrow band reflective characteristics of two different colors. The reflective characteristics are provided by fringe patterns recorded in a combiner using holographic techniques.

U.S. Pat. No. 4,655,540 discloses an optical system employing a holographic optical element to eliminate perceptible variations in image brightness. This system employs a holographic combiner.

U.S. Pat. No. 4,688,879 employs two holographic optical elements as a combiner. These elements use Bragg condition phenomena to reflect a CRT image with minimum attenuation by the combiner.

U.S. Pat. No. 3,953,117 describes a bicolor single image plane color display using a two layer polychromatic film.

U.S. Pat. No. 4,447,128 discloses a diffraction grating head-up display which blocks solar radiation from washing out a displayed image. The system teaches a combiner consisting of a holographic diffraction optics lens which operates according to conventional Bragg diffraction phenomena.

The above devices are representative of the art known to applicant and alone and in combination suffer from a number of limitations. Some of these devices are not conducive for assembly in compact configurations for example, in head up display applications. Other systems use a substantial amount of glass and therefore are heavier than desirable for lightweight applications. In addition, glass elements may be broken and therefore represent a potential safety hazard.

Moreover, many of these systems require holographic components for controlling image brightness and for combining images of different colors. However, holographic combiners are complex and suffer themselves from a number of limitations.

In addition, most head up display systems use an optical collimation apparatus along with the combiner apparatus. In many configurations, the combiner apparatus and the collimation apparatus require multiple filtering and reflections of the primary image such that the transmissivity and ultimately the brightness of the image to an observer is low. Patent application Ser. No. 080,739 for an Optical Collimating Apparatus, filed Aug. 3, 1987, discusses the problems attending optical collimation apparatus used in visual display systems for an aircraft head-up display or like applications.

Moreover, many of these systems use a number of different components. However, the use of different components can complicate handling procedures and purchase order lot sizes, which can ultimately affect the cost of fabricating the system.

Thus, there is a present need in the art for an optical display system in general, and an optical combiner in particular, with improved transmissivity characteristics. Further, since the optical combiner may be included in a helmet mounted display system or other applications where size and weight are critical there is a present need for an optical combiner which is both compact, lightweight, shatter free and amenable for mass fabrication.

SUMMARY OF THE INVENTION

The present invention is directed to an optical combiner that utilizes the properties of cholesteric liquid crystals to combine a first image incident on the combiner in a first direction, with a second image incident on the combiner from a second direction.

According to a preferred embodiment of the invention, the optical combiner includes at least one cholesteric liquid crystal element The cholesteric element transmits the first image in the first direction and reflects the second image in the first direction. In a sophisticated embodiment for multicolor display applications, the combiner includes a plurality of cholesteric liquid crystal elements, each having a maximum reflectivity at a different color. The cholesteric elements may be deposited in layers one on another to form a single combiner element.

The invention may be used as a component of a collimating apparatus for focusing an image at or closer than an infinite distance from an observer in a line of sight. The collimating apparatus includes an image source for generating a first image, a transmitter combiner according to the invention, and a collimating component. The transmitter combiner includes at least one cholesteric liquid crystal element for transmitting a second image in the line of sight and for reflecting a first generated image into the line of sight. The combined images are provided to the collimating component which is disposed between the combiner and the observer.

In a display system having a monochromatic image source, and that uses a plurality of color images, an improved optical shutter is also provided according to the invention. The optical shutter is disposed between the source and the combiner for switching the color of the projected image between differing colors. In a preferred embodiment, the shutter comprises a plurality of cholesteric liquid crystal elements disposed in series, with each cholesteric element having a band width of maximum reflectivity at a different color. An optical switching element is disposed after the cholesteric elements for switching the color of the second image.

The various embodiments of the invention provide increased transmissivity, more lightweight and compact configurations, and safer optical elements as compared to the prior art.

Transmission efficiency is increased over the prior art in that fewer reflections and transmissions of the image take place and in that the cholesteric liquid crystal element transmits and/or reflects a higher percentage of the incident light than the devices of the prior art.

More compact and lightweight combiners and therefore display systems are provided because of the relative weight of cholesteric elements as compared to glass and because the cholesteric elements can be formed in thin layers which overlie other elements of the display systems.

The invention provides a safer combiner and optical display system because the cholesteric elements will not shatter as will common glass combiners.

Additional objects, features and advantages of the invention will become more readily apparent by reference to the brief description of the drawings, the detailed description and the appended claims.

DETAILED DESCRIPTION OF THE PREFERRED EMBODIMENT

The invention will now be explained first by reference to a display system having a combiner according to the prior art and then by reference to various display systems having combiners according to the invention. Although the invention will be explained primarily by reference to its use with a collimating apparatus in a head-up display system, it should be understood that the disclosed embodiments are illustrative only and that the combiner, shutter, and display systems according to the invention may be used in other applications.

Figure 1:
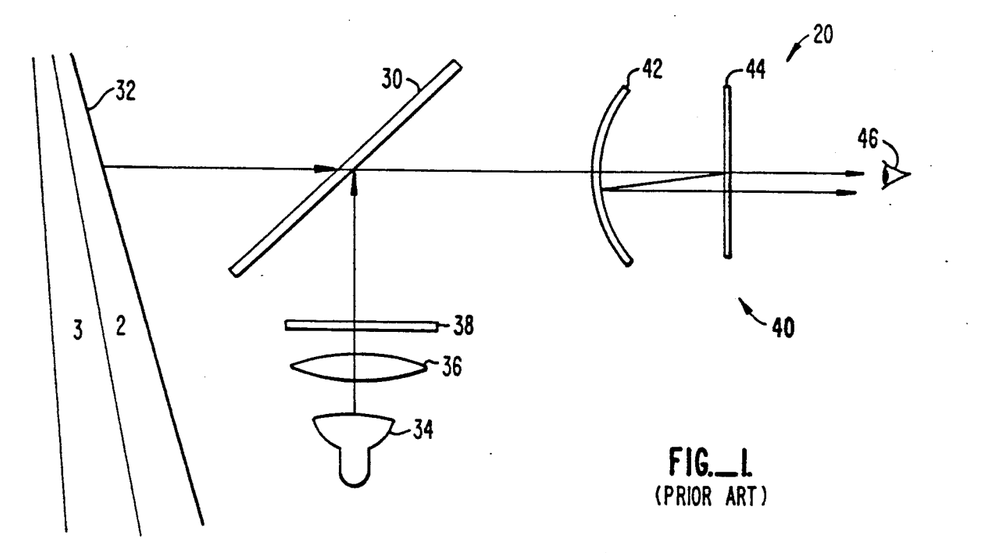
FIG. 1 illustrates a display system having a combiner according to the prior art.

Referring now to FIG. 1, a head up display system 20 includes a collimating apparatus 40 and a combiner 30. These elements are disposed in the line of sight of an observer 46.

The combiner 30 combines an external image 32 with a projected image from a source such as cathode ray tube 34. The projected image from cathode ray tube 34 passes through collimating optics 36 and a circular polarizer 38 and is incident on combiner 30 from the direction of the source 34.

The external image 32 travels along a line of sight and is incident on combiner 30 in the direction of the line of sight.

Combiner 30 transmits the external image 32 and reflects the projected image in the line of sight in the direction of the observer 46.

The images are transmitted from combiner 30 to the collimating apparatus 40. Collimating apparatus 40 includes a semireflective concave mirror 42 and a cholesteric liquid crystal element 44. The external image 32 is transmitted by the combiner 30 to semireflective concave mirror 42 which in turn transmits image 32 to cholesteric liquid crystal element 44. Cholesteric liquid crystal element 44 transmits image 32 to observer 46, except for a reflective portion of image 32 which is of the rotary sense and within the bandwidth of reflection of cholesteric liquid crystal element 44. That portion of image 32 which is reflected, is reflected without reversal of its rotary sense to the concave side of semireflective concave mirror 42. Semireflective concave mirror 42 reflects that portion of image 32 back to cholesteric liquid crystal element 44, reversing its rotary sense in so doing, so that that portion of image 32 is as well transmitted by cholesteric liquid crystal element 44 to observer 46.

The system of FIG. 1 is the subject of, and is described in detail in U.S. patent application Ser. No. 080,739, Optical Collimating Apparatus, incorporated herein by reference in its entirety. The combiner 30 in that system has a transmissivity of about 0.5, is composed of glass, and does not have polarizing properties. A separate polarizer 38, itself having a transmissivity of 0.5, is also used.

Although the collimating apparatus and display system of FIG. 1 represents an improvement over other prior art systems, there still exists a need to reduce the number of components or to otherwise increase the transmissivity for a system such as that shown in FIG. 1.

Figure 2A:
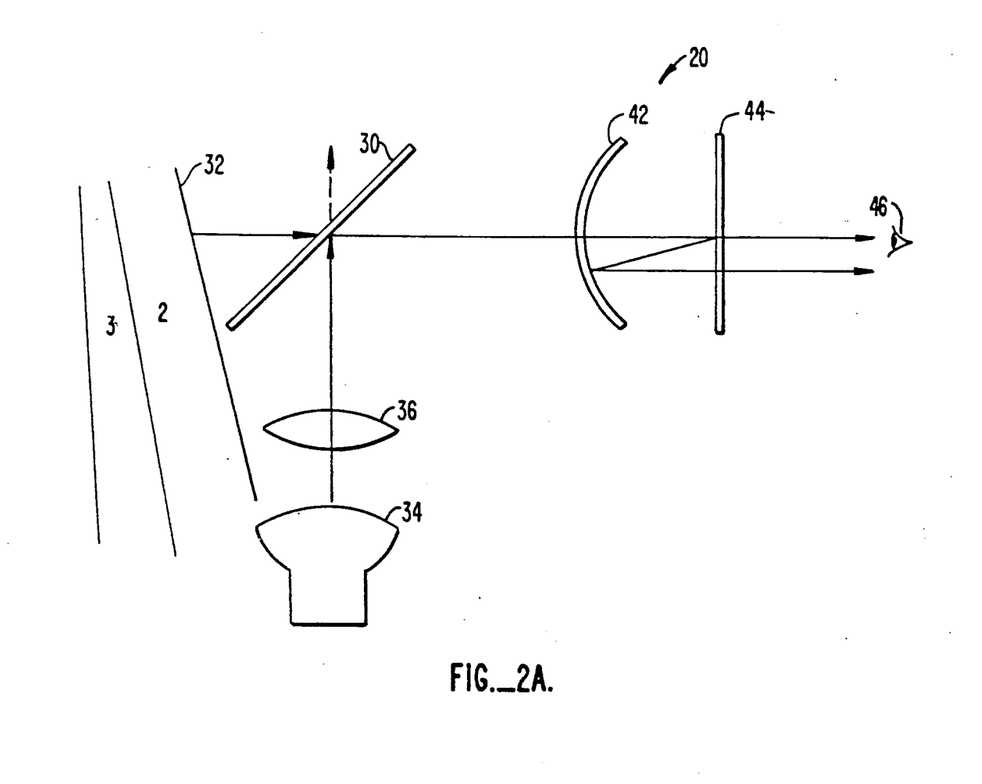
FIGS. 2A and 2B illustrate combiners as used in display systems according to embodiments to the invention.

Refer now to FIG. 2A which shows an improved display system that includes a combiner according to the invention. The display system 20 of FIG. 2A is similar to the configuration in FIG. 1 except that the circular polarizer 38 and combiner 30 have been replaced with a single combiner element 30.

Combiner element 30 is a cholesteric liquid crystal element which will reflect a single color of a given circular polarity, for example, left-handed circularly polarized green light, for the embodiment in FIG. 2A.

The combiner element 30 will transmit external image 32 along the line of sight and in the direction of observer 46.

Combiner element 30 will transmit all components of light from the image source 34 out of the line of sight but will reflect the left-handed green cholesteric component into the line of sight toward the observer 46.

Cholesteric element 30 has a bandwidth of maximum reflectivity that is tuned to the colored wavelength of the light output from the image source 34. Thus, in this embodiment, source 34 is a cathode ray device that outputs green light having a wavelength of approximately 540 nanometers. Combiner element 30 would thus be a left-handed cholesteric liquid crystal element having a bandwidth of maximum reflectivity centered at 540 nanometers. Thus, the green image from the cathode ray display 34 would be substantially all reflected toward the observer 46 in combination with the external image 32.

The configuration of FIG. 2A provides a number of advantages with respect to the configuration of FIG. 1 and with respect to prior art systems in general.

For example, the transmissivity of the display system in FIG. 2A is twice the transmissivity for the prior art system in FIG. 1. As shown in the detailed description for the Optical Collimating Apparatus Ser. No. 080,739, the transmissivity for external image 32 as received at observer 46 is 22.3% and the transmissivity for the projected image from source 34 is 4.95%.

Considering the transmissivity of the external image in FIG. 2, the transmissivity for the combiner is 0.89, for the semi-reflective mirror is 0.5 and for the cholesteric reflector is 0.89. Thus, the transmissivity for the external image is $(0.89) \times (0.5) \times (0.89)$, or a total of 40% transmissivity.

Considering the transmissivity of the color image projected from source 34 in FIG. 2A through the combiner collimating apparatus system, the parameters of the applicable values are as follows. The combiner has a transmissivity of (0.5) and a reflectivity of (0.5). The semireflective mirror has a transmissivity of (0.5). The cholesteric liquid crystal has a reflectivity of (1) in this instance. The reflected light has a reflectivity of (0.5) from the semireflective mirror. This twice reflected light has a transmissivity of (1) through the cholesteric liquid crystal element in this instance, because the handedness of the polarization has changed by the semireflective mirror. Thus, the transmission through the system for the color image is $(0.5) \times (0.5) \times (1) \times (1.5) \times (1)$, or 12.5%.

In both cases, the transmission of the external image and the projected image has been improved by a factor of 2. The improved transmission means that the images will be seen by the observer with improved clarity. Further, image source 34 may generate images at a lower power level to maintain similar visibility, or images generated with the same power will have improved intensity and brightness over the prior art.

In addition to providing a combiner having increased transmissivity, it can be seen that the single combiner 30 performs the function of the circular polarizer and the transmitter combiner for FIG. 1. In addition, for the embodiment of FIG. 2A, the cholesteric element used in combiner 30 is an identical element to the cholesteric element used in the collimating apparatus 40. Thus, the number of different piece part components for the display system 20 is reduced in addition to the overall number of total components required. Further, the cholesteric liquid crystal element will not shatter and thus provides a relatively hazard free optical element.

Figure 2B:
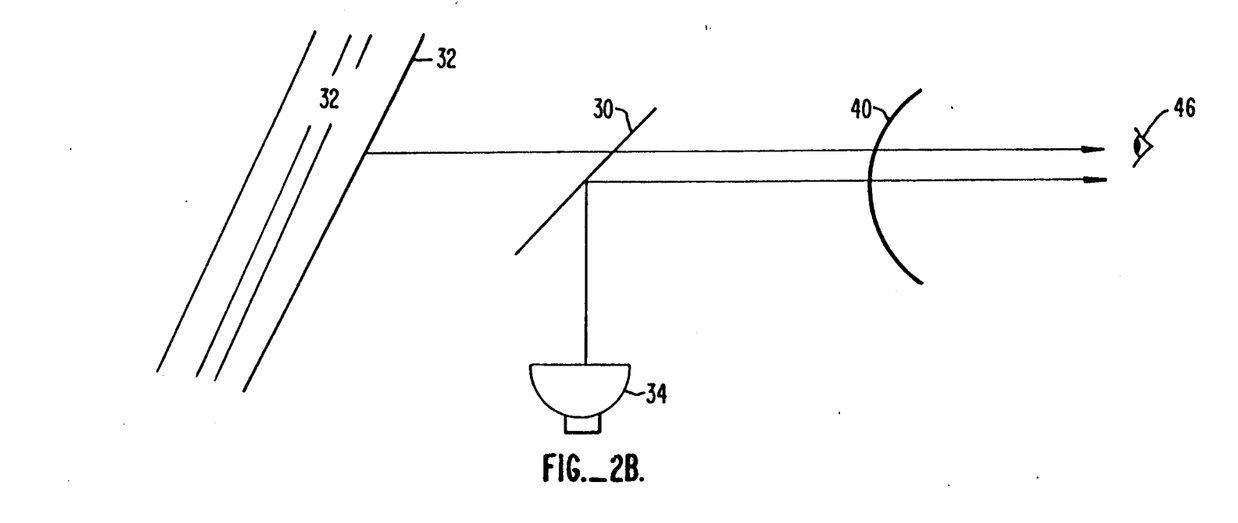

The combiner according to the invention can also be used in a display system other than the embodiment shown in FIG. 2A. For example, the combiner could be used as shown in FIG. 2B to provide combined images to a conventional collimator 40, such as a pancake window, which would in turn transmit the combined images to an observer 46.

Figure 3:
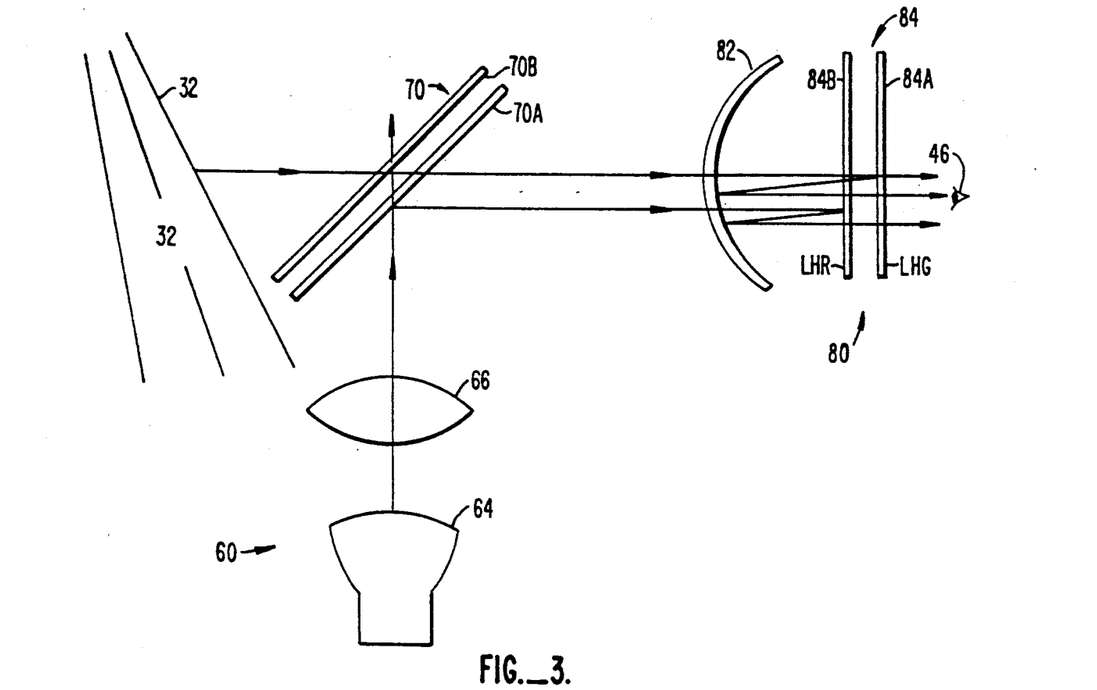
FIGS. 3, 4 and 6 are combiners as used in two and three color display systems according to embodiments of the invention.
Figure 4:
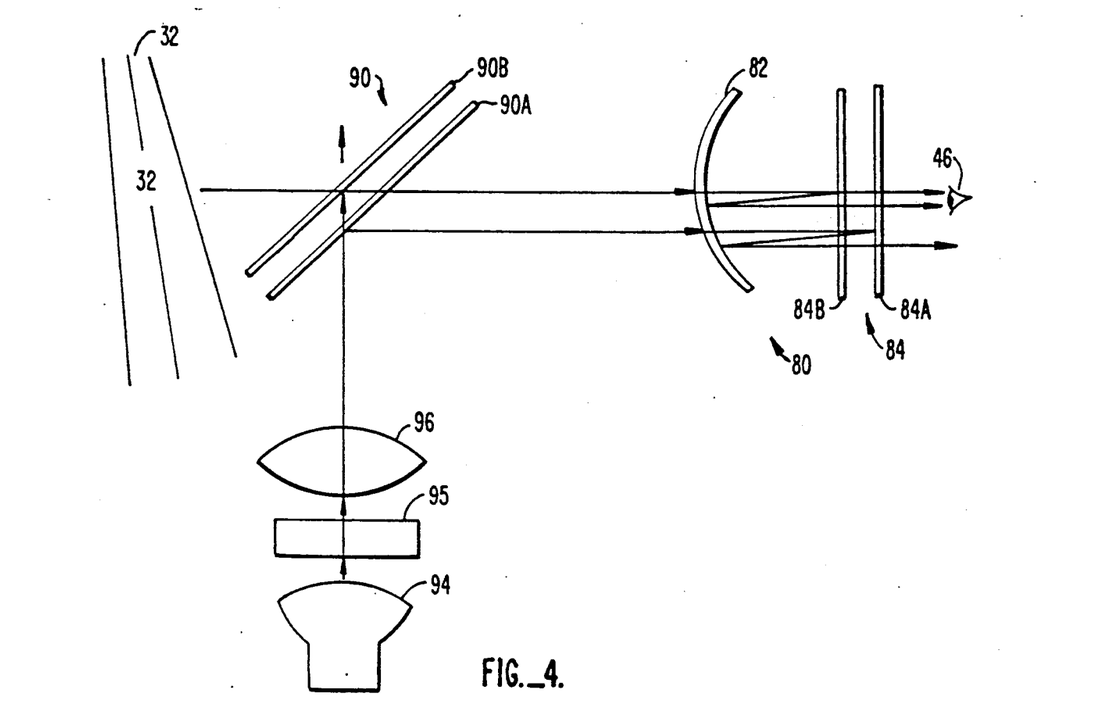
Figure 6:
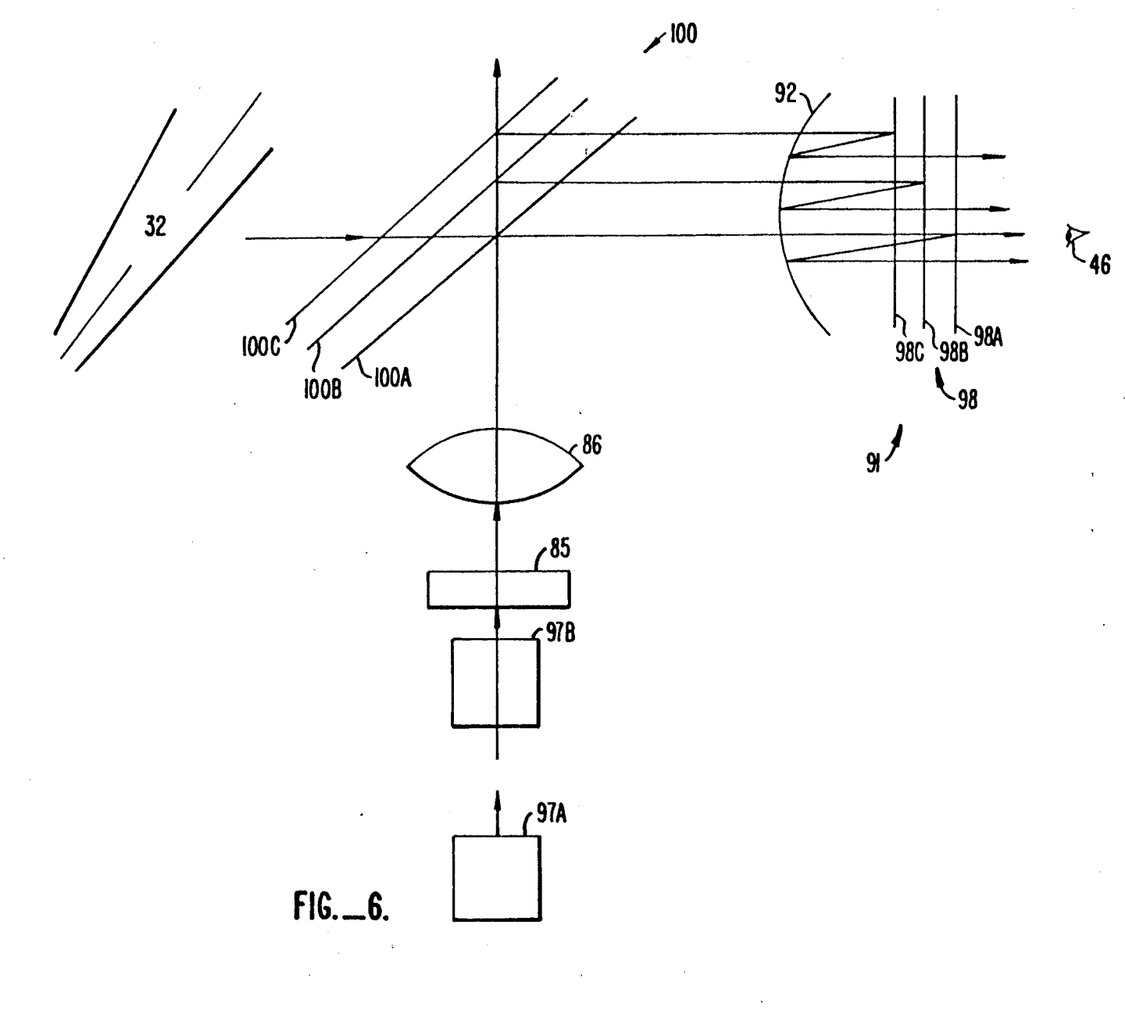

Refer now to FIGS. 3, 4 and 6 which show various embodiments of a combiner according to the invention as used in multicolor display systems.

Referring to FIG. 3 a display system 60 includes a two-color image source such as a CRT 64. Two-color CRT 64 transmits red and green images through collimating optics 66 to a combiner 70. The combiner 70 includes two cholesteric liquid crystal elements 70a and 70b. Element 70a has a bandwidth of maximum reflectivity centered at the wavelength of the green colored image from display 64. Cholesteric element 70b has a bandwidth of maximum reflectivity centered at the wavelength for the red images from source 64. Elements 70a and 70b are left-handed cholesteric elements.

In operation, cholesteric elements 70a and 70b will transmit out of the line of sight the right-handed components (if any) of the red and green colored images received at combiner 70. The left-handed red and green components of the red and green images will be reflected into the line of sight to a collimating apparatus 80.

For the embodiment shown in FIG. 3 collimating apparatus 80 includes a concave one-half silvered mirror 82 and a matching pair of left-handed green and red cholesteric liquid crystal elements 84a and 84b. Elements 84a and 84b will first reflect the left-handed red and green cholesteric images back to the concave silvered mirror 82. The concave silvered mirror 82 will reverse the polarity of the incident red and green and thus transmit right-handed red and green colored images to elements 84a and 84b. The right-handed green and red images will be transmitted through elements 84a and 84b to the pilot 46.

As can be seen from FIG. 3, the combiner and the collimating apparatus 80 now each have two left handed cholesteric reflectors which are tuned to the wavelengths of the CRT.

It should be understood that the imaging source 64 is not restricted to a CRT but can be any type of two color display for the embodiment of FIG. 3.

Referring to FIG. 4 there is shown a two-color display system having a monochrome imaging source 94. The light output from monochrome display 94 has two color components. The display system in FIG. 4 includes a color shutter 95 that is disposed between the image source 94 and the combiner 90. The shutter 95 is used to quickly switch the projected light output between the two color components in the image from monochrome display 94.

Referring to FIG. 6, there is shown a three-color optical display system. For the embodiment of FIG. 6, the three colors are red, blue and green. Projected images are generated by using either a three-color display 97A or a monochrome display 97B.

Where a monochrome display is used a three-color shutter 85 is used to receive the monochrome output of display 97B and to provide an output that switches between the three colors.

The output of three-color display 84a and alternatively the output of shutter 85 is transmitted through collimating optics 86 to a three-color combiner assembly 100. Combiner 100 includes three cholesteric liquid crystal elements 100A, 100B and 100C. These elements have bandwidths of maximum reflectivity that are matched to the green, red and blue outputs from the three-color display 97A and alternatively from the shutter 85.

The combiner 100 combines transmitted external image 32 with the reflected left-handed green, red and blue colored projected images. The combined images are transmitted to a collimating apparatus 91 in the line of sight.

The collimating apparatus 91 may include a conventional three-color pancake type collimating apparatus or an improved configuration as shown in FIG. 6. For the improved configuration, the collimating apparatus 91 includes a concave one-half silvered mirror 92 and three left-handed cholesteric liquid crystal elements that have bandwidths of maximum reflectivity matched to the colors and the image projected from three-color display 97A alternatively shutter 85.

Each of the three cholesteric reflector elements 98A, 98B and 98C optically cooperate with the concave mirror element as was previously explained for the single and pair of cholesteric reflectors.

Referring to FIGS. 5A through 5G, there are shown various embodiments of color shutters for use in display systems according to the invention.

Figure 5A:
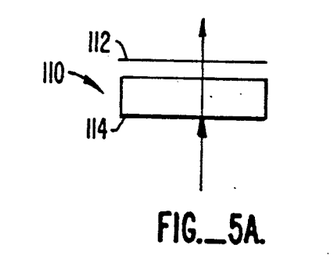
FIGS. 5A through 5G are various embodiment of a color shutter according to the invention.

The shutter 110 in FIG. 5A includes a conventional single liquid crystal color shutter 114 with a ¼ Lambda waveplate oriented at 45° to the output of single shutter filter 114.

Figure 5B:
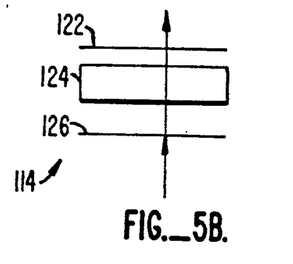

Referring to FIG. 5B, shutter 114 includes a red-green linear polarizer 126, a liquid crystal color cell 124 and a linear polarizer 122.

In operation shutters 110 and 114 will alternately transmit right-handed circularly polarized red light and then right-handed circularly polarized green light. The alternating left-handed circularly polarized light output will in turn be reflected by one of the cholesteric films in the combiner into the line of sight.

Figure 5C:
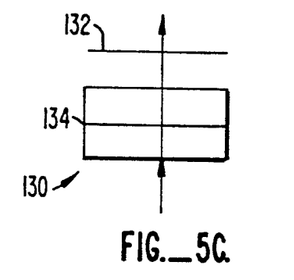
Figure 5D:
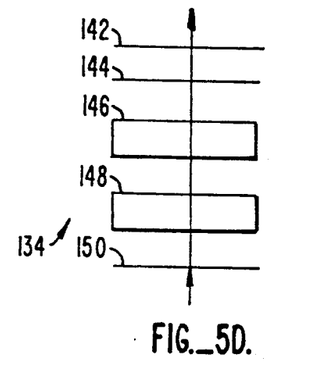

FIG. 5C shows a shutter 130 that includes a push/pull color shutter configuration 134 that feeds a ¼ Lambda waveplate 132. Referring to FIG. 5D, the push/pull color shutter 134 includes a red-green linear polarizer 150, a first liquid crystal color cell 148, a second liquid crystal color cell 146, a ¼ Lambda waveplate 144, and a linear polarizer 142. Shutter 130 also alternately transmits red and green left-hand circularly polarized light but has a faster switching speed than the shutter in FIG. 5A.

Figure 5E:
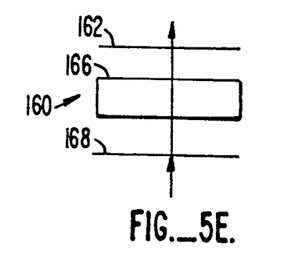

Referring to FIG. 5E, there is shown a simplified embodiment of a shutter 160 that includes a ¼ Lambda waveplate 162 that follows a liquid crystal color cell 166 and a red-green linear polarizer 168.

Shutter 160 operates as follows. In a high voltage state, the shutter transmits green left-handed circularly polarized light and red right-handed circularly polarized light. The left-handed cholesteric elements in the combiner will transmit the right-handed red light out of the line of sight and reflect the left-handed green light into the line of sight.

In a low voltage state, the shutter transmits green right-handed circularly polarized light and red left-handed circularly polarized light. The left-handed cholesteric elements in the combiner will transmit the right-handed green light out of the line of sight and reflect the left-handed red light into the line of sight. Shutter 160 will be brighter than the shutter in FIGS. 5A and 5B because of the absence of at least one linear polarizer component.

Figure 5F:
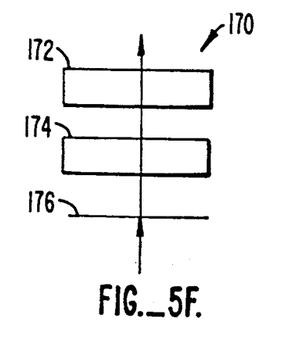

Referring to FIG. 5F another simplified color shutter 170 is shown. Color shutter 170 includes a red-green linear polarizer 176 that feeds a pair of push/pull liquid crystal color cells 174 and 172.

Shutter 170 operates as follows. When the liquid crystal color cells are in a high voltage state, shutter 170 outputs right-handed red and left handed green light.

When the liquid crystal color cells are subject to a low voltage state, shutter 170 outputs left-handed red and right-handed green light.

At least a linear polarizer and a ¼ Lambda waveplate have been removed for the configuration in FIG. 5F. Thus, shutter 170 will be brighter and faster than the previously discussed shutters.

Figure 5G:
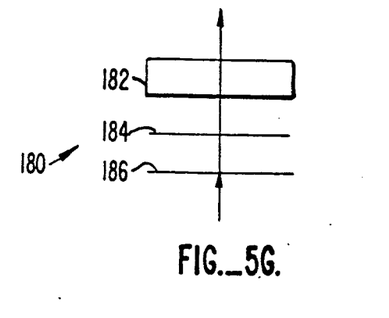

Referring to FIG. 5G there is shown a color shutter 180 that includes a green right-handed cholesteric liquid crystal element that feeds a red left-handed cholesteric element 184. The red left-handed cholesteric element in turn feeds a liquid crystal color cell 182.

Shutter 180 operates as follows. In a high voltage state, shutter 180 outputs left-handed red and a right-handed green light. In the low voltage state, shutter 180 outputs right-handed red and left-handed green light. For this configuration a very high transmission rate is achieved by replacing the linear polarizers and the ¼ waveplate with the cholesteric polarizers.

The operation of typical liquid crystal color cells is described by J. N. Pollack and T. J. Harvey, Proceedings of the SID, Vol. 27/4, 1986, pgs. 257 et seq. The use, construction, and operation of typical push/pull liquid crystal color cells is described by J. L. Ferguson, STIE, Vol. 684, Dec. 19, 1986. The foregoing papers are incorporated herein by reference.

Figure 8:
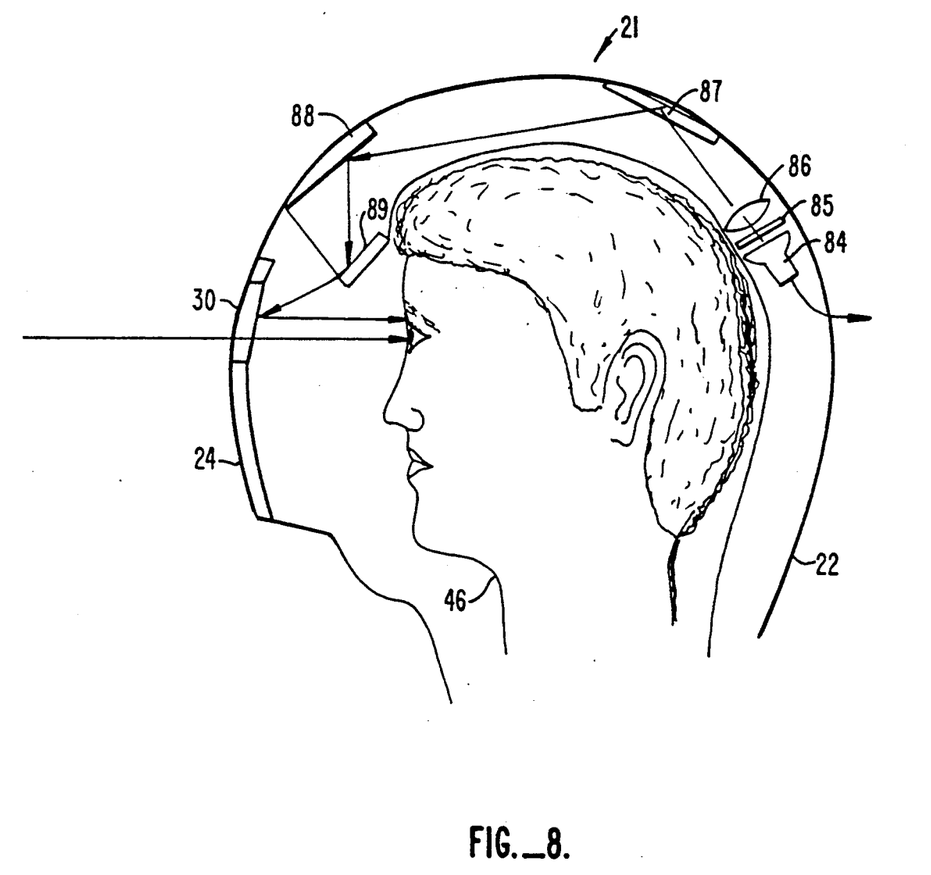
FIG. 8 is a stylized pictorial illustration of a helmet including a combiner according to one embodiment of the invention.

Referring to FIG. 8, there is shown a stylized pictorial illustration of a helmet incorporating a combiner and color shutter in a display system according to invention.

The helmet mounted display system 21 includes a helmet 22 having a visor 24 through which a pilot 46 views the outside environment. A combiner 30 is disposed on (including in) the visor 24 and is fed an image from CRT 84 over an optical path defined by a shutter 85, optics 86, and mirror elements 87, 88, and 89. The combiner combines the image from the CRT with the view from the outside, e.g. along line of sight X.

Figure 7:
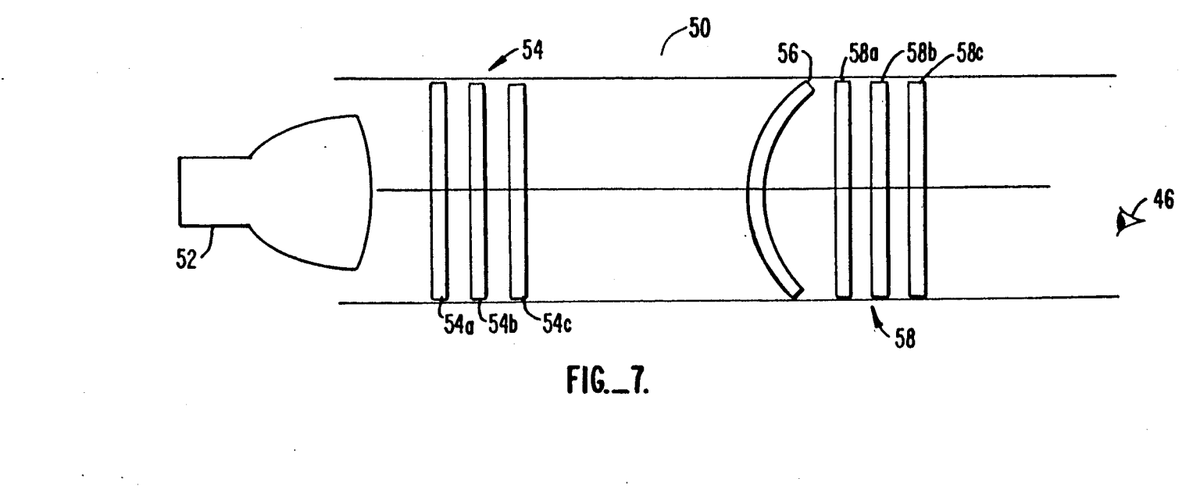
FIG. 7 is a diagram of a collimating apparatus according to one embodiment of the invention.

To those skilled in the art to which this invention relates, many changes in construction and widely different embodiments and applications of the present invention will suggest themselves without departing from the spirit and scope of the invention. For example, the invention may be used for collimating an image generated by an image source for a flight simulator or similar device. As shown in FIG. 7, the apparatus 50 according to this alternate embodiment is comprised of an image source 52, circular polarizing filter 54, semireflective concave mirror 56, and a plurality of cholesteric liquid crystal reflectors 58a, 58b and 58c. Image source 52 is a three-color display that generates, for example, green, red and blue images as output. Thus, circular polarizer 54 would consist of left-handed cholesteric elements 54a, 54b and 54c and the collimating apparatus 58 would include left-handed cholesteric elements 58a, 58b and 58c, respectively.

In this alternate embodiment there may or may not be a transmitter combiner depending on the desired use of the apparatus. In addition, if source 52 were a monochrome source, a color shutter having three cholesteric elements could be employed within the scope of the invention.

Further, although left-handed cholesteric elements have been primarily used in the embodiments, it should be understood that right-handed cholesteric elements may be substituted therefor without varying from the scope of the invention.

It should also be understood that the bandwidth of maximum reflectivity can be matched to green, red or blue by varying the cholesteric liquid crystals elements composition where desired These and other characteristics of cholesteric elements may thus be employed depending on the specific application.

Further, the physical arrangement of the optical elements described herein may be varied for specific results.

Thus, the disclosure and the description herein are purely illustrative and are not intended to be in any sense limiting.

I claim:

1. An optical combiner for combining a first image incident on said combiner in a first direction with a second image incident on said combiner in a second direction, said combiner comprising:
at least one cholesteric liquid crystal element for transmitting said first image in said first direction and for concurrently reflecting said second image in said first direction.

2. The invention of claim 1, said at least one cholesteric element comprising a plurality of cholesteric liquid crystal elements each having a maximum reflectivity at a different color.

3. The invention of claim 2 and wherein said plurality of cholesteric elements are deposited in layers one on another to form a single element.

4. A display system comprising:
An optical combiner for combining a first image incident on said combiner in a first direction with a second image incident on said combiner in a second direction, said combiner comprising at least one cholesteric liquid crystal element for transmitting said first image in said first direction and for reflecting said second image in said first direction.

5. The invention of claim 4 further comprising:
an image source for generating said second image, said second image including a plurality of colors; and
an optical color shutter disposed between said source and said combiner for switching the color of said second image.

6. The invention of claim 5 and wherein said shutter comprises:
a plurality of cholesteric liquid crystal elements disposed in series, each cholesteric element having a maximum reflectivity at a different color; and
an optical switching element disposed after said cholesteric elements for switching the color of said second image.

7. The invention of claim 4 and wherein said first direction is a line of sight to an observer, said invention further comprising an optical collimating apparatus disposed between said combiner and said observer for focusing said images at or closer than an infinite distance from said observer in said line of sight.

8. An optical collimating apparatus for focusing an image at or closer than an infinite distance from an observer in a line of sight from said observer comprising:
at least one cholesteric liquid crystal element disposed in said line of sight for polarizing said image;
a semireflective concave mirror disposed in said line of sight after said at least one element for transmitting said image; and
a second cholesteric liquid crystal element disposed in said line of sight after said concave mirror for transmitting a first portion of said image to said observer and for reflecting a second portion of said image back to said mirror, said mirror reflecting said second portion back to said second cholesteric element, said second cholesteric element transmitting said second portion to said observer.

9. The invention of claim 8 and wherein said cholesteric elements substantially all have the same circular polarization.

10. The invention of claim 8 and wherein cholesteric element comprises a plurality of cholesteric elements each having a maximum reflectivity at a different color.

11. An improved optical collimating system for focusing an image at or closer than an infinite distance from an observer in a line of sight from said observer comprising:
an image source for generating a first image
a transmitter/combiner, said transmitter/combiner comprising a first cholesteric liquid crystal element for transmitting a second image in said line of sight and for reflecting said first image in said line of sight;
a semireflective concave mirror disposed in said line of sight for transmitting said images; and
a second cholesteric liquid crystal element disposed in said line of sight after said concave mirror of said first image to said observer and for reflecting a second portion of said first image back to said mirror, said mirror receiving said second portion and reflecting said first portion back to said second cholesteric element, said second cholesteric element transmitting said first portion to said observer.

12. The invention of claim 11, wherein said first cholesteric liquid crystal element comprises a plurality of cholesteric liquid crystal elements each having a maximum reflectivity at a different color.

13. The invention of claim 11 wherein said first cholesteric liquid crystal element circularly polarizes said first image as it is concurrently reflected with said transmission of said second image.

14. The invention of claim 11 and wherein said cholesteric elements are disposed on opposing sides of said semireflective mirror.

15. The invention of claim 11 and wherein said second cholesteric element comprises a plurality of cholesteric liquid crystal elements each having a maximum reflectivity at a different color.

16. A method of combining optical images comprising the steps of:
disposing at least one cholesteric element in a line of sight to an observer;
transmitting a first image to and through said at least one cholesteric element in said line of sight;
transmitting a second image to said at least one cholesteric element in a second direction; and
reflecting said second image into said line of sight with at least one cholesteric element concurrently with said transmission of said first image through said one cholesteric element.

17. An improved optical combiner collimating apparatus for directing a first and a second image from a first optical path into a line of sight of a receiver, comprising:
an image forming device for providing the first image having a first wavelength and the second image having a second wavelength;
a first collimating optical element disposed along the first optical path for collimating said first and second images;
a first cholesteric optical element disposed at a junction of said first optical path and the line of sight, said first cholesteric optical element having a primary wavelength substantially at said first wavelength and disposed to reflect a first portion of said first image having a first particular circular polarization along said line of sight and to transmit a second portion of said first image having a first orthogonal polarization out of said line of sight;
a second cholesteric optical element disposed at a junction of said first optical path and the line of sight, said second cholesteric optical element having a primary wavelength substantially at said second wavelength and disposed to reflect a first portion of said second image having a second particular circular polarization along said line of sight and to transmit a second portion of said second image having a second orthogonal polarization out of said line of sight;

a third cholesteric optical element disposed along said line of sight and having a primary wavelength substantially at said first wavelength and disposed to reflect a first time said first portion of said first image of said first particular circular polarization from said first cholesteric optical element toward said first optical element and to transmit said first orthogonal polarization along said line of sight to the receiver;

a fourth cholesteric optical element disposed along said line of sight and having a primary wavelength substantially at said second wavelength and disposed to reflect a first time said portion of said second image of said second particular circular polarization from said second cholesteric optical element toward said second optical element and to transmit said first orthogonal polarization along said line of sight to said receiver; and a semireflective concave mirror, disposed between said first and third and between said second and fourth cholesteric optical elements along said line of sight, for reflecting a second time some of said reflected first portions of said first and second images to said third and fourth cholesteric optical elements, said twice reflected first and second images have said first and second particular polarization changed respectively to said first and second orthogonal polarization wherein said third and fourth cholesteric optical elements will transmit said twice reflected first portions of said images along said line of sight to said receiver.

* * * * *